United States Patent
Allam et al.

(10) Patent No.: US 7,416,716 B2
(45) Date of Patent: Aug. 26, 2008

(54) PURIFICATION OF CARBON DIOXIDE

(75) Inventors: Rodney John Allam, Guildford (GB); Vincent White, Epsom (GB); Edwin John Miller, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 436 days.

(21) Appl. No.: 11/287,640

(22) Filed: Nov. 28, 2005

(65) Prior Publication Data
US 2007/0122328 A1    May 31, 2007

(51) Int. Cl.
*C01B 31/20* (2006.01)
*C01B 17/74* (2006.01)
*C01B 21/40* (2006.01)

(52) U.S. Cl. ............... 423/437.1; 423/235; 423/243.01; 423/243.02; 423/243.03; 423/393; 423/522; 423/523

(58) Field of Classification Search .................. 423/235, 423/243.01, 243.02, 243.03, 393, 437.1, 423/522, 523
See application file for complete search history.

(56) References Cited

U.S. PATENT DOCUMENTS

| 4,004,995 A * | 1/1977 | Machi et al. ............. 204/157.3 |
| 4,288,421 A | 9/1981 | Kudo et al. |
| 5,788,949 A * | 8/1998 | O'Brien ...................... 423/523 |
| 2004/0001788 A1 * | 1/2004 | Marin et al. ................. 423/210 |
| 2007/0178035 A1 * | 8/2007 | White et al. ................. 423/248 |

FOREIGN PATENT DOCUMENTS

| EP | 0 602 354 A2 | 6/1994 |
| EP | 0 716 875 A1 | 6/1996 |
| JP | 58 133820 | 8/1983 |
| WO | 01/08785 | 2/2001 |

OTHER PUBLICATIONS

Dillon, D. J., "Oxy-Combustion Processes for CO2 Capture From Advanced Supercritical PF and NGCC Power Plant", presented at GHGT-7, Vancouver, Sep. 2004).
Jordal, "Oxyfuel Combustion For Coal-Fired Power Generation with CO2 Capture—Opportunities and Challenges", (GHGT-7, Vancouver, 2004).
Keilin, "Development of the Catalytic Chamber Process for the Manufacture of Sulfuric and Nitric Acids from Waste Flue Gases", Contract No. PH86-68-75; Prepared for the US Environmental Protection Agency Office of Air Programs 1967 to 1969.

* cited by examiner

*Primary Examiner*—Timothy C Vanoy
(74) *Attorney, Agent, or Firm*—Willard Jones, II

(57) ABSTRACT

$SO_2$ and/or $NO_x$ are removed from gaseous $CO_2$ at elevated pressure(s) in the presence of molecular oxygen and water and, when $SO_2$ is to be removed, $NO_x$, to convert $SO_2$ to sulfuric acid and/or $NO_x$ to nitric acid. The sulfuric acid and/or nitric acid is/are then removed from the gaseous carbon dioxide to produce $SO_2$-free, $NO_x$-lean carbon dioxide gas. The invention has particular application in the removal of $SO_2$ and/or $NO_x$ from carbon dioxide flue gas produced in an oxyfuel combustion process, for example, in a pulverized coal fired power station.

30 Claims, 1 Drawing Sheet

PURIFICATION OF CARBON DIOXIDE

BACKGROUND OF THE INVENTION

The present invention relates to a method for the removal of one or more contaminants selected from the group consisting of sulfur dioxide ("$SO_2$") and $NO_x$ from gaseous carbon dioxide. The invention has particular application in the purification of carbon dioxide flue gas from an oxyfuel combustion process, for example, in a pulverized coal fired power station in which sulfur containing carbonaceous or hydrocarbon fuel is combusted in a boiler to produce steam for electric power generation.

The term "$NO_x$" means at least one nitrogen oxide compound selected from the group consisting of nitric oxide ("NO") and nitrogen dioxide ("$NO_2$").

It has been established that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be in a geological formation such as a saline aquifier or a depleted oil or natural gas formation. Alternatively, the $CO_2$ could be used for enhanced oil recovery.

The oxyfuel combustion process seeks to mitigate the harmful effects of $CO_2$ emissions by producing a net combustion product gas consisting of $CO_2$ and water vapour by combusting a carbonaceous or hydrocarbon fuel in pure oxygen. This process would result in an absence of nitrogen in the flue gas, together with a very high combustion temperature which would not be practical in a furnace or boiler. In order to moderate the combustion temperature, part of the total flue gas stream is recycled, after cooling, back to the burner.

An oxyfuel process for $CO_2$ capture from a pulverised coal-fired power boiler is described in a paper entitled "Oxy-combustion processes for $CO_2$ capture from advanced supercritical PF and NGCC power plants" (Dillon et al; presented at GHGT-7, Vancouver, September 2004), the disclosure of which is incorporated herein by reference.

Oxyfuel combustion produces a raw $CO_2$ product containing contaminants such as water vapour, "inerts" including excess combustion molecular oxygen ($O_2$), molecular nitrogen ($N_2$) and argon (Ar) derived from the oxygen used, any air leakage into the system, and acid gases such as sulfur trioxide ($SO_3$), sulfur dioxide ($SO_2$), hydrogen chloride (HCl), nitric oxide (NO) and nitrogen dioxide ($NO_2$) produced as oxidation products from components in the fuel or by combination of $N_2$ and $O_2$ at high temperature. The precise concentrations of the gaseous impurities present in the flue gas depend on the fuel composition, the level of $N_2$ in the combustor, the combustion temperature and the design of the burner and furnace.

In general, the final $CO_2$ product will be produced as a high pressure fluid stream for delivery into a pipeline for disposal. The $CO_2$ must be dry to avoid corrosion of the carbon steel pipeline. The $CO_2$ impurity levels must not jeopardise the integrity of the geological storage site, particularly if the $CO_2$ is to be used for enhanced oil recovery, and the transportation and disposal must not infringe international and national treaties and regulations governing the transport and disposal of gas streams.

It is, therefore, necessary to purify the impure $CO_2$ from the boiler or furnace to remove water vapour, sulfur trioxide and sulfur dioxide ("$SO_x$"), nitric oxide and nitrogen dioxide ("$NO_x$"), soluble gaseous impurities such as HCl, and "inert" gases such as $O_2$, $N_2$ and Ar in order to produce a final $CO_2$ product which will be suitable for disposal.

In general, the prior art in the area of $CO_2$ capture using the oxyfuel process has up to now concentrated on removal of $SO_x$ and $NO_x$ upstream of the $CO_2$ compression system using current state of the art technology. $SO_x/NO_x$ removal is based on flue gas desulphurisation schemes such as scrubbing with limestone slurry followed by air oxidation producing gypsum and $NO_x$ reduction using a variety of techniques such as low $NO_x$ burners, over firing or using reducing agents such as ammonia or urea at elevated temperature with or without catalysts. Conventional $SO_x/NO_x$ removal using desulphurisation and $NO_x$ reduction technologies is disclosed in "Oxyfuel Combustion For Coal-Fired Power Generation With $CO_2$ Capture—Opportunities And Challenges" (Jordal et al; GHGT-7, Vancouver, 2004). Such process could be applied to conventional coal boilers.

A process for the conversion of $SO_x/NO_x$, present in the stack gas of fossil fuel fired boilers, into concentrated $H_2SO_4$ and $HNO_3$ has been developed Tyco Labs., Inc. and is described in a report titled "Development of the catalytic chamber process for the manufacture of sulphuric and nitric acids from waste flue gases" (Keilin et al; Contract number PH86-68-75; Prepared for the US Environmental Protection Agency Office of Air Programs 1967 to 1969). The Tyco process is based on the lead chamber process for sulphuric acid manufacture. In this process $SO_2$ is oxidized to $SO_3$ by reaction with $NO_2$ (see Equation (a));

$$SO_2 + NO_2 = SO_3 + NO \qquad (a).$$

This reaction is followed by dissolution of the $SO_3$ in water to form sulphuric acid (see Equation (b));

$$SO_3 + H_2O = H_2SO_4 \qquad (b).$$

The NO is reoxidized to $NO_2$ by reaction with oxygen present in the flue gas (see Equation (c));

$$2NO + O_2 = 2NO_2 \qquad (c)$$

The $NO_x$ acts as a gas phase catalyst.

This process would not normally be feasible at atmospheric pressure and with the low concentrations of $NO_x$ present.

A further problem would be the rather slow kinetics of the NO oxidation step. The Tyco process gets over this problem in two ways. First, it increases the $NO_2$ concentration in the stack gas by a factor of about 100 by recycling an $NO_2$ rich gas stream which is mixed with the stack gas prior to $SO_2$ oxidation and $H_2SO_4$ production. The $H_2SO_4$ is recovered in a high temperature scrubber, which allows the bulk of the water vapour in the stack gas to pass through the unit without condensation, producing an acid of about 80% concentration. The $NO_2$ and NO react with the sulphuric acid to form nitrosyl sulphuric acid so that about 90% of the $NO_x$ present in the flue gas is removed together with virtually all of the $SO_x$ (see Equation (d)).

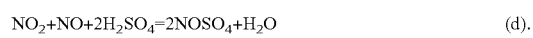

$$NO_2 + NO + 2H_2SO_4 = 2NOSO_4 + H_2O \qquad (d).$$

Secondly, the slow oxidation of NO to $NO_2$ is speeded up by passing the nitrosyl sulphuric acid through a stripper tower which is swept by a small side-stream of the flue gas feed which provides the $O_2$ needed for net NO oxidation to $NO_2$. The oxidation reaction in the stripper tower is assisted by an active carbon catalyst which circulates in the liquid phase.

There is a need for an improved method for the removal of $SO_x/NO_x$ from gaseous carbon dioxide, particularly from carbon dioxide flue gas produced in an oxyfuel combustion process such as that involved in a pulverized coal-fired power boiler.

BRIEF SUMMARY OF THE INVENTION

According to the first aspect of the present invention, there is provided a method for the removal of at least a portion of one or more contaminants selected from the group consisting of $SO_2$ and $NO_x$ from gaseous carbon dioxide, said method comprising:

maintaining said gaseous carbon dioxide at elevated pressure(s) in the presence of molecular oxygen and water and, when $SO_2$ is to be removed, $NO_x$, for a sufficient time to convert $SO_2$ to sulfuric acid and/or $NO_x$ to nitric acid; and separating said sulfuric acid and/or nitric acid from said gaseous carbon dioxide to produce $SO_2$-free, $NO_x$-lean carbon dioxide gas.

According to a second aspect of the present invention, there is provided apparatus for the removal of one or more contaminants selected from the group consisting of $SO_2$ and $NO_x$ from gaseous carbon dioxide, said apparatus comprising:

a compressor for elevating the pressure of gaseous carbon dioxide;

at least one counter current gas/liquid contact device for washing said gaseous carbon dioxide with water at elevated pressure in the presence of molecular oxygen and, when SO2 is to be removed, NOx for a sufficient time to convert SO2 to sulfuric acid and/or NOx to nitric acid;

conduit means for feeding gaseous carbon dioxide at elevated pressure from said compressor to the or each respective gas/liquid contact device; and conduit means for recycling aqueous sulfuric acid solution and/or aqueous nitric acid solution to the or each respective gas/liquid contact device.

DETAILED DESCRIPTION OF THE INVENTION

Figure 1:
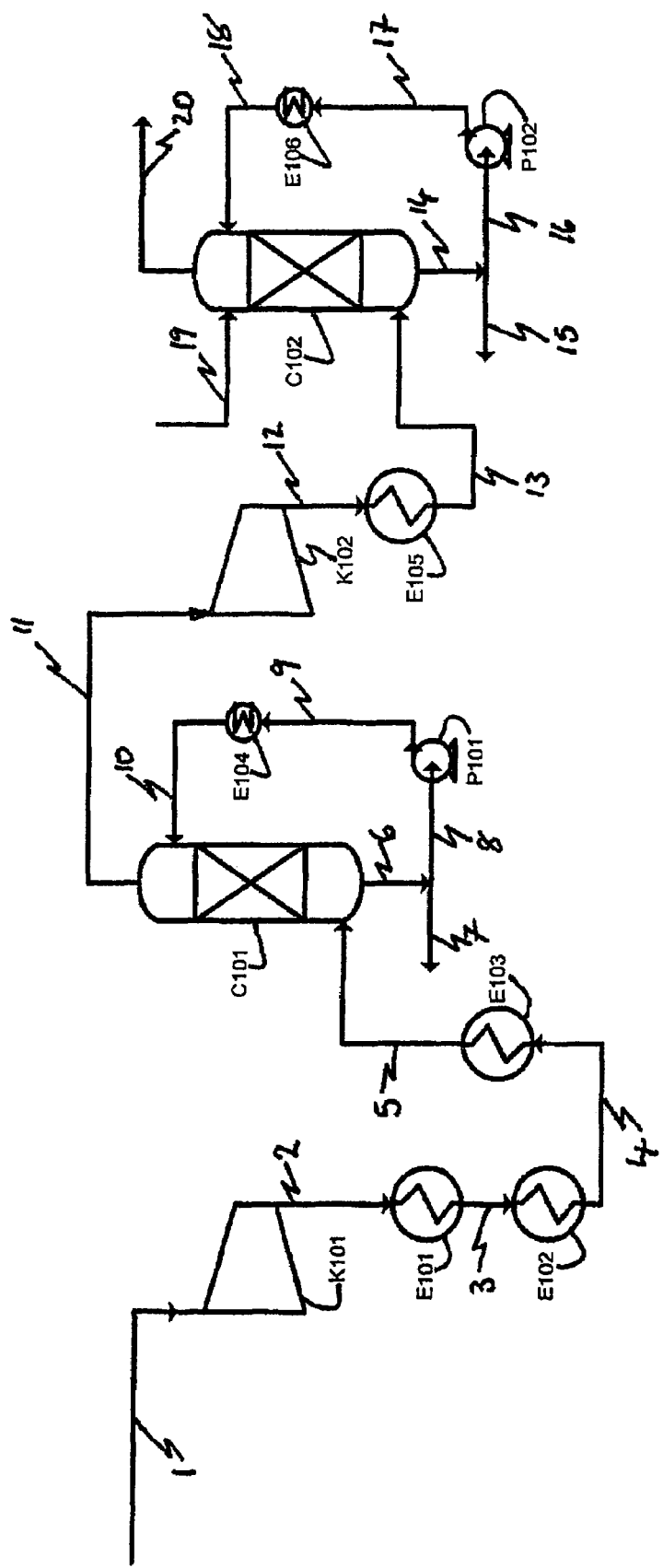
FIG. 1 is a schematic representation (or flow sheet) of a preferred embodiment of the present invention

The method of the present invention provides for the removal of at least a portion of one or more contaminants selected from the group consisting of $SO_2$ and $NO_x$ from gaseous carbon dioxide. The method comprises:

maintaining the gaseous carbon dioxide at elevated pressure(s) in the presence of molecular oxygen and water and, when $SO_2$ is to be removed, NOx, for a sufficient time to convert $SO_2$ to sulfuric acid and/or NOx to nitric acid; and separating said sulfuric acid and/or nitric acid from said gaseous carbon dioxide to produce $SO_2$-free, $NO_x$-lean carbon dioxide gas.

The method typically removes at least substantially all (and usually all) of any $SO_2$ contaminant and the bulk, usually about 90%, of any $NO_x$.

The reactions which take place between $SO_2$, $SO_3$, $H_2O$, NO, and $NO_2$ when impure $CO_2$ (containing these compounds) is maintained at an elevated pressure (i.e. higher than atmospheric pressure) are:

$$NO + \tfrac{1}{2} O_2 \leftrightarrow NO_2 \tag{1}$$

$$2NO_2 \leftrightarrow N_2O_4 \tag{2}$$

$$2NO_2 + H_2 \leftrightarrow HNO_2 + HNO_3 \tag{3}$$

$$3HNO_2 \leftrightarrow HNO_3 2NO + H_2O \tag{4}$$

$$NO_2 + SO_2 \leftrightarrow NO + SO_3 \tag{5}$$

$$SO_3 + H_2O \leftrightarrow H_2SO_4 \tag{6}$$

These reactions can be described as follows:

Reaction (1) is gas phase, kinetically controlled;

Reaction (2) is gas phase, equilibrium controlled with fast kinetics;

Reaction (3) is liquid phase, kinetically controlled;

Reaction (4) is liquid phase, equilibrium controlled with fast kinetics;

Reaction (5) is gas phase, equilibrium controlled with fast kinetics; and

Reaction (6) is dissolution in the water phase which can be designed in a contactor to be a fast process.

Reactions (1) and (3) have reaction rates that limit the conversion process, whereas Reactions (2), (4) and (5) are considered to be fast enough not to limit the process.

Reaction (1) has been extensively studied and it has been well established as a third-order homogeneous reaction with a rate constant k ($L^2$ $mol^{-2}$ $s^{-1}$)=$1.2 \times 10^3 e^{530/T}$ with T in Kelvin. The rate, $-d[NO]/dt = 2k[NO]^2[O_2]$, is third order and so proportional to pressure to the third power. In addition, the reaction rate increases with decreasing temperature. The Inventors have realised that the pressure and temperature relationship to the conversion rate can be used to remove effectively SOx/NOx from gaseous carbon dioxide.

The Inventors have found that the rate of Reaction (1) does not become useful until the pressure has increased to at least about 3 bar and preferably from about 10 bar to about 50 bar, for example, in a $CO_2$ compression train where the gas has been cooled in the compressor intercooler or aftercooler. At least a portion of the compression is preferably adiabatic.

The precise temperature to which the gas is cooled determines the amount of water vapour present in the resultant $CO_2$ gas and hence the amount of water vapour that condenses in, for example, an acid scrub tower. The excess acid is removed at a concentration determined by the operating temperature, the pressure and the levels of $H_2O$ and $SO_2$ present in the crude $CO_2$ stream.

Reactions (1) and (5) together are the lead chamber process for the manufacture of sulphuric acid, catalysed by $NO_2$. Reaction (5) is known to be fast and so is considered to be equilibrium limited. Reactions (1) to (4) are part of the nitric acid process and so are well known.

The Inventors have realised that the above mentioned reactions provide a path-way for $SO_2$ to be removed as $H_2SO_4$ and for NO and $NO_2$ to be removed as $HNO_3$ provided that the reactive components are provided with sufficient contact time after elevation of the pressure of the raw (or impure) $CO_2$. Contact time (or "hold-up") determines the degree of conversion of $SO_2$ to $H_2SO_4$ and $NO_x$ to $HNO_3$. A total "hold-up"

time of no more than 60 seconds is usually sufficient for maximum conversion of $SO_2/NO_x$.

Counter current gas/liquid contact devices such as columns or scrub towers allow intimate mixing of water with $SO_3$ and then with $NO_2$ to remove continuously these components from the gas thereby allowing reactions to proceed until at least substantially all $SO_2$ is removed, together with the bulk of the $NO_x$. Such devices are suitable for provided the required contact time for the conversion(s). No $HNO_2$ or $HNO_3$ will be formed until all of the $SO_2$ has been consumed. $NO_2$ formed by the slow Reaction (1) will be consumed by the fast Reaction (5) before the slow Reaction 3 can produce $HNO_2$ or $HNO_3$.

Without $SO_2$ being present, Reactions (1)-(4) become the nitric acid process. A small amount of water also helps the reaction pathway by pushing Reaction (3) towards the right.

The molecular oxygen required for the conversions may be added to the gaseous carbon dioxide. However, an amount of molecular oxygen is usually present in the gaseous carbon dioxide, for example any excess molecular oxygen used in an oxyfuel combustion process. Water is usually present in the gaseous carbon dioxide, for example, having been produced in an oxyfuel combustion process.

The gaseous carbon dioxide is usually washed with water in at least one counter current gas/liquid contact device to produce the $SO_2$-free, $NO_x$-lean carbon dioxide gas and an aqueous sulfuric acid solution and/or an aqueous nitric acid solution. The aqueous acid solutions are usually dilute. At least a portion of the or each aqueous solution is preferably recycled to the or each respective gas/liquid contact device. Where the contact device is a column or scrub tower, the solution is recycled to the top of the column or tower. The recycle portion(s) of the or each aqueous solution are usually pumped to higher pressure(s) to produce pumped solution(s) which are then cooled before recycling.

In preferred embodiments in which gaseous carbon dioxide comprises $SO_2$ and $NO_x$, the method comprises converting $SO_2$ to sulfuric acid at a first elevated pressure and converting $NO_x$ to nitric acid at a second elevated pressure which is higher than the first elevated pressure. A portion of the $NO_x$ may be converted to nitric acid at the first elevated pressure. For example, if $SO_2$ feed concentration is sufficiently low, there could be more nitric acid than sulfuric acid produced at the first elevated pressure.

In these embodiments, the method usually comprises:
washing the gaseous carbon dioxide with water at said first elevated pressure in a first counter current gas/liquid contact device to produce $SO_2$-free carbon dioxide gas and an aqueous sulfuric acid solution;
compressing at least a portion of the $SO_2$-free carbon dioxide gas to the second elevated pressure; and
washing at least a portion of the $SO_2$-free carbon dioxide gas with water at the second elevated pressure in a second counter current gas/liquid contact device to produce $SO_2$-free, $NO_x$-lean carbon dioxide gas and an aqueous nitric acid solution. At least a portion of the aqueous sulfuric acid solution is usually recycled to the first gas/liquid contact device, optionally after pumping and/or cooling. At least a portion of the aqueous nitric acid solution is usually recycled to the second gas/liquid contact device, optionally after pumping and/or cooling.

Heat of compression may removed by indirect heat exchange with a coolant. The coolant is preferably feed water for an oxyfuel boiler, for example, the boiler producing the gaseous carbon dioxide.

In embodiments where the or each contact device is a gas/liquid contact column or a scrub tower, a stream of water from an external source may be injected into the top of the or each contact device. Water injected into the top of a first gas/liquid contact column would ensure that no acid is carried downstream to corrode apparatus such as compressor(s). Water injected into the top of a second gas/liquid contact column increases the conversion of $NO_x$ to nitric acid for a given contact time and recycle rate.

The first elevated pressure is usually from about 10 bar to about 20 bar and is preferably about 15 bar. Where the gaseous carbon dioxide is compressed to the first elevated pressure, such compression is preferably adiabatic.

The second elevated pressure is usually from about 25 bar to about 35 bar and is preferably about 30 bar.

The contact time of carbon dioxide gas and water in the gas/liquid contact devices is known as the residence time. The gaseous carbon dioxide preferably has a residence time in the first gas/liquid contact device of from about 2 seconds to about 20 seconds. The $SO_2$-free carbon dioxide gas preferably has a residence time in the second gas/liquid contact device of from about 2 seconds to about 20 seconds.

One of the advantages of preferred embodiments of the present invention is that the method works with concentrations of $NO_x$, as low as 300 ppm. The concentration of $NO_x$ in the gaseous carbon dioxide is preferably from about 300 ppm to about 10,000 ppm. In embodiments where the gaseous carbon dioxide does not comprise $NO_x$ as a contaminant, the method further comprises adding to the gaseous carbon dioxide at least the minimum amount of $NO_x$ required to convert said $SO_2$ to sulfuric acid. In those embodiments, the amount of $NO_x$ added is preferably from about 300 ppm to about 10,000 ppm.

The temperature at which the gaseous carbon dioxide is maintained at said elevated pressure(s) to convert $SO_2$ to sulfuric acid and/or $NO_x$ to nitric acid is usually no more than about 80° C. and preferably no more than about 50° C. In preferred embodiments, the temperature is no less than about 0° C. and is preferably from about 0° C. to 50° C. Most preferably, the temperature is near ambient, for example, about 30° C.

The method is suitable to purify streams of carbon dioxide from any source, provided that the streams contain $SO_x$ and/or $NO_x$ as contaminants. However, the method has particular application when integrated with an oxyfuel combustion process. In preferred embodiments, crude gaseous carbon dioxide is produced in an oxyfuel combustion process and washed with water to remove solid particles and water soluble components thereby producing gaseous carbon dioxide, usually at about atmospheric pressure. The gaseous carbon dioxide is then compressed, preferably adiabatically, to elevated pressure(s).

Where the gaseous carbon dioxide is produced in an oxyfuel combustion process, the process usually involves the combustion of at least one sulfur containing fuel selected from the group consisting of carbonaceous fuel or hydrocarbon fuel, in a gas consisting essentially of molecular oxygen and, optionally, recycled flue gas from the combustion process.

At least a portion of the $SO_2$-free, $NO_x$-lean carbon dioxide gas may be further processed. In this connection, the gas is usually dried, purified to remove "inert" components, and compressed to a pipeline pressure of from about 80 bar to about 250 bar. The gas may then be stored in geological formations or used in enhanced oil recovery. In preferred embodiments, the gas is dried in a desiccant drier, and then cooled to a temperature close to its triple point where "inerts" such as $O_2$, $N_2$ and Ar, are removed in the gas phase. This process allows the $CO_2$ loss with the inert gas stream to be minimised by fixing the feed gas pressure at an appropriate high level in the range 20 bar to 40 bar. A suitable "inerts" removal process is described in a paper titled "Oxyfuel conversion of heaters and boilers for $CO_2$ capture" (Wilkinson et al; Second National Conference on Carbon Sequestration; May 5-8, 2003; Washington, D.C.), the disclosure of which is incorporated herein by reference. This process leads to $CO_2$ purities of around 95 to 98% and $CO_2$ recoveries of 90% to 95%.

In preferred embodiments, $SO_2$ is converted to sulfuric acid and/or $NO_x$ to nitric acid at inter-stages of a carbon dioxide compression train. Where the gas is washed with water, these embodiments have the advantage that the water also cools the gas to remove heat of compression.

The method for the removal of $SO_2$ and $NO_x$ from gaseous carbon dioxide produced in an oxyfuel combustion process, preferably comprises washing crude carbon dioxide produced in the oxyfuel combustion process with water to remove solid particles and water soluble components thereby producing the gaseous carbon dioxide;

compressing adiabatically at least a portion of the gaseous carbon dioxide to produce gaseous carbon dioxide at a first elevated pressure;

washing the gaseous carbon dioxide with water at the first elevated pressure in a first counter current gas/liquid contact device to produce $SO_2$-free carbon dioxide gas and an aqueous sulfuric acid solution, at least a portion of said aqueous sulfuric acid solution being recycled to the first gas/liquid contact device;

compressing at least a portion of the $SO_2$-free carbon dioxide gas to produce $SO_2$-free carbon dioxide gas at a second elevated pressure; and washing the $SO_2$-free carbon dioxide gas with water at the second elevated pressure in a second counter current gas/liquid contact device to produce $SO_2$-free, $NO_x$-lean carbon dioxide gas and an aqueous nitric acid solution, at least a portion of the aqueous nitric acid solution being recycled to the second gas/liquid contact device.

Where the method is integrated with an oxyfuel combustion process using coal as fuel, mercury will be present in the gaseous carbon dioxide based on typical coal compositions. A further advantage of the present invention is that, as nitric acid is produced, any elemental mercury or mercury compounds present in the gaseous carbon dioxide will also be removed as elemental mercury in the vapor phase will be converted to mercuric nitrate and mercury compounds react readily with nitric acid. Typical nitric acid concentrations in the process will be sufficient to remove all mercury from the carbon dioxide stream, either by reaction or dissolution.

The apparatus of the present invention provides for the removal of one or more contaminants selected from the group consisting of $SO_2$ and $NO_x$ from gaseous carbon dioxide. The apparatus comprises:

a compressor for elevating the pressure of gaseous carbon dioxide;

at least one counter current gas/liquid contact device for washing the gaseous carbon dioxide with water at elevated pressure in the presence of molecular oxygen and, when $SO_2$ is to be removed, $NO_x$, for a sufficient time to convert $SO_2$ to sulfuric acid and/or $NO_x$ to nitric acid;

conduit means for feeding gaseous carbon dioxide at elevated pressure from the compressor to the or each respective gas/liquid contact device; and conduit means for recycling aqueous sulfuric acid solution and/or aqueous nitric acid solution to the or each respective gas/liquid contact device.

In preferred embodiments, apparatus for the removal of $SO_2$ and $NO_x$ contaminants from gaseous carbon dioxide, wherein molecular oxygen is present in the gaseous carbon dioxide, comprises:

a first compressor for compressing gaseous carbon dioxide to a first elevated pressure;

a first counter current gas/liquid contact device for washing the gaseous carbon dioxide with water at the first elevated pressure for a sufficient time to produce SO2-free carbon dioxide gas and an aqueous sulfuric acid solution;

conduit means for feeding said gaseous carbon dioxide at the first elevated pressure from the first compressor to the first gas/liquid contact device; and conduit means for recycling aqueous sulfuric acid solution to the first gas/liquid contact column;

a second compressor for compressing at least a portion of the SO2-free carbon dioxide gas to a second elevated pressure which is higher than the first elevated pressure;

a second counter current gas/liquid contact device for washing the $SO_2$-free carbon dioxide gas with water at the second elevated pressure for a sufficient time to produce $SO_2$-free, $NO_x$-lean carbon dioxide gas and an aqueous nitric acid solution;

conduit means for feeding the $SO_2$-free carbon dioxide gas at said second elevated pressure from the second compressor to the second gas/liquid contact device; and conduit means for recycling aqueous nitric acid solution to the second gas/liquid contact device.

In preferred embodiments of the apparatus, the first and second compressors are stages of a carbon dioxide compression train.

Referring to FIG. 1, the net flue gas from an oxyfuel-fired furnace (not shown) is cooled to 30° C. and the condensed water and soluble components are removed to produce a stream 1 of impure carbon dioxide. A direct contact tower (not shown) could be used in this respect. The impure carbon dioxide comprises molecular oxygen and water, together with $SO_2$ and $NO_x$ contaminants. The proportions of the $SO_2$ and $NO_x$ contaminants in the impure carbon dioxide depend on the composition of the fuel used in the oxyfuel-fired furnace.

Stream 1 is then compressed to a first elevated pressure of about 15 bar absolute ("bara") in an axial adiabatic compressor K101 to produce a stream 2 of compressed impure carbon dioxide. Stream 2 is at a temperature of about 308° C. and is used to preheat boiler feed water (not shown) by indirect heat exchange in heat exchanger E101 to produce a stream 3 of cooled carbon dioxide which is then further cooled in heat exchanger E102 by indirect heat exchange against a stream of condensate (not shown) to produce a stream 4 of further cooled carbon dioxide. The warmed boiler feed water and condensate streams (not shown) are returned to the oxyfuel boiler (not shown). Stream 4 is then cooled by indirect heat exchange against a stream of cooling water (not shown) in heat exchanger E103 to produce a stream 5 of carbon dioxide at a temperature of about 30° C.

Heat exchangers E101, E102 and E103 provide sufficient contact time between the contaminants, the molecular oxygen and the water to convert a portion of the $SO_2$ contaminant in impure carbon dioxide stream 3, 4 and 5 to sulfuric acid.

Stream 5 is fed to the bottom of a first counter current gas/liquid contacting column C101 where it ascends in direct contact with descending water. A stream 11 of $SO_2$-free carbon dioxide gas is removed from the top of column C101 and a stream 6 of aqueous sulfuric acid solution (that also contains nitric acid) is removed from the base of the column C101.

The column C101 provides sufficient contact time between the ascending gas and descending liquid for conversion of the remainder of the $SO_2$ contaminant to produce sulfuric acid. The contact time is also sufficient for a portion of the $NO_x$ contaminant to be converted to nitric acid. The contact time in column C101 is calculated to allow complete conversion of $SO_x$ to sulfuric acid, together with conversion to nitric acid of a portion of the $NO_x$ contaminant. Reducing the contact time in column C101 would reduce, first, the amount of $NO_x$ converted to nitric acid and, then, reduce the amount of $SO_x$ converted to sulfuric acid.

Stream 6 is divided into two portions. A first portion 7 can be further concentrated (not shown) or it can be neutralized by reaction with limestone to produce gypsum (not shown). Nitric acid present in portion 7 would be converted to soluble calcium nitrate in such a neutralization reaction. A second portion 8 is pumped in pump P101 to produce a pumped stream 9 of aqueous sulfuric acid solution which is then cooled by indirect hear exchange against cooling water (not shown) in heat exchanger E104 to produce a stream 10 of cooled, pumped aqueous sulfuric acid solution. Heat exchanger E104 removes heat of reaction produced by the exothermic conversion reactions in column C101. Stream 10 is recycled to the top of the column C101.

Water can be injected (not shown) into the top of column C101 in a separate packed section (not shown) should it be necessary to ensure that no acid drops are carried downstream of column C101 in stream 11.

The flow sheet depicted in FIG. 1 shows the cooling sequence between compressor K101 and column C101. Condensation will probably occur in exchanger E102. If such condensation is considered to be a corrosion issue, extra duty could be placed on exchanger E104 in the recycle circuit by allowing the 15 bar gas of stream 5 to enter the column C101 above its condensation temperature.

Stream 11 contains no $SO_x$ and the $NO_x$ content is reduced. Stream 11 is compressed to about 30 bar in compressor K102 to produce a stream 12 of compressed $SO_2$-free carbon dioxide gas. Increasing the pressure of the stream 11 of $SO_2$-free carbon dioxide gas stream further increases the rate of conversion of $NO_x$ to nitric acid.

Heat of compression generated by compressor K102 in stream 12 is removed by indirect heat exchange in heat exchanger E105 to produce a stream 13 of cooled, compressed $SO_2$-free carbon dioxide gas.

Stream 13 is fed to the base of a second counter current gas/liquid contact column C102. The $SO_2$-free gas ascends column C102 in direct contact with descending water. A stream 20 of $SO_2$-free, $NO_x$-lean carbon dioxide gas is removed from the top of column C102 and a stream 14 of aqueous nitric acid solution is removed from the base of column C102.

Column C102 provides contact time between the ascending gas and the descending liquid for conversion of the bulk of the remaining $NO_x$ contaminant to produce nitric acid.

Stream 14 of aqueous nitric acid solution is divided into two portions. A first portion 15 is removed and a second portion 16 is pumped in pump P102 to produce a stream 17 of pumped nitric acid solution which in turn is cooled by indirect heat exchange in heat exchanger E106 which removes heat of reaction produced by converting $NO_x$ to nitric acid in column C102 to produce a stream 18 of cooled, pumped nitric acid solution. Stream 18 is recycled to the top of column C102.

A stream 19 of fresh water is injected into the top of column C102. Although this water dilutes the nitric acid, its addition increases the conversion of $NO_x$ to nitric acid for a given column contact time and recycle rate.

All of the $SO_2$ contaminant and most, e.g. about 90%, of the $NO_x$ contaminant in the flue gas generated in the oxyfuel combustion process is removed using this process to produce the stream 20 of $SO_2$-free, $NO_x$-lean carbon dioxide. Stream 20 can now be further treated as required. For example, stream 20 can be dried (not shown) and the molecular oxygen, molecular nitrogen and argon "inerts" can be removed (not shown) to produce purified carbon dioxide gas which may then be compressed to a pipeline pressure of from about 80 bar to about 250 bar for storage or disposal.

The process may be used to purify flue gas from an oxyfuel combustion process having a high concentration of $SO_2$ contaminant. Such high concentrations of $SO_2$ contaminant may be due to the oxyfuel combustion process using coal, containing high levels of sulfur, as the fuel. Additionally or alternatively, high concentrations of $SO_2$ contaminant may be due to no separate $SO_2$ (or $NO_x$) removal applied downstream of the combustion process but before compression in compressor K101.

It is conceivable that an existing power station, converted to oxyfuel combustion, would have $SO_2$ and/or $NO_x$ removal. It is also possible that lower sulfur coal could be used. In either case, the amount of $SO_2$ to be converted in column C101 would be less. Therefore, the contact time in column C101 would need to be only minimal to ensure that nitric acid is removed in column C102. Alternatively, column C101 could be designed to remove the required amounts of $NO_x$ thereby making column C102 redundant which would then be replaced with a simple separation vessel to removed condensed liquid.

In the simplest version of the flow sheet, both columns C101 and C102 could be simple separation vessels allowing condensed liquid (dilute acid) to be removed. Since this would not provide the length of contact time that the direct contacting columns would provide, the conversion of $NO_x$ to nitric acid would be reduced to levels that may require further treatment of gases that are to be vented to the atmosphere. A further option is to eliminate heat exchanger E105 and carry out the removal of the heat of compression in column C102, with the heat being removed by heat exchanger E106 to cooling water or condensate preheating.

An additional advantage of the present invention is that any elemental mercury or mercury compounds present in the carbon dioxide flue gas from the power station will be quantitatively removed by reaction with nitric acid in column C101 and/or column C102.

EXAMPLE

Computer simulations of the embodiment of the present invention exemplified in FIG. 1 have been carried out for the purification of oxyfuel combustion flue gas containing low and high concentrations of sulfur.

Table 1 depicts the heat and mass balance for the relevant process streams for the "low sulfur" case.

Table 2 depicts the heat and mass balance for the relevant process streams in the "high sulfur" case.

TABLE 1

| | | Stream Number | | | | | | | |
|---|---|---|---|---|---|---|---|---|---|
| | | 1 | 2 | 3 | 4 | 5 | 7 | 9 | 10 |
| Temperature | ° C. | 30.00 | 307.67 | 185.00 | 50.00 | 35.66 | 46.06 | 46.06 | 30.00 |
| Pressure | bar a | 1.01 | 15 | 15 | 15 | 15 | 15 | 15 | 15 |
| Flow | kg/s | 148.65 | 148.65 | 148.65 | 148.65 | 148.65 | 5.63 | 130.36 | 130.36 |
| Composition | | | | | | | | | |
| AR | mol % | 2.7401 | 2.7401 | 2.7404 | 2.7442 | 2.7596 | 0.0000 | 0.0000 | 0.0000 |
| $CO_2$ | mol % | 71.2638 | 71.2638 | 71.2723 | 71.3715 | 71.7718 | 0.0335 | 0.0335 | 0.0335 |
| $N_2$ | mol % | 15.9177 | 15.9177 | 15.9195 | 15.9417 | 16.0311 | 0.0002 | 0.0002 | 0.0002 |
| NO | ppm | 4136.7452 | 4136.7452 | 4138.6834 | 4144.4443 | 4167.6920 | 0.1226 | 0.1226 | 0.1226 |
| $NO_2$ | ppm | 1.4474 | 1.4474 | 0.0001 | 0.0000 | 0.0000 | 0.0165 | 0.0165 | 0.0165 |
| $O_2$ | mol % | 4.7227 | 4.7227 | 4.7194 | 4.6795 | 4.5188 | 0.0000 | 0.0000 | 0.0000 |
| $N_2O_4$ | mol % | 0.0000 | 0.0000 | 0.0000 | 0.0000 | 0.0000 | 0.0000 | 0.0000 | 0.0000 |
| $HNO_3$ | mol % | 0.0000 | 0.0000 | 0.0000 | 0.0000 | 0.0000 | 8.6087 | 8.6087 | 8.6087 |
| $HNO_2$ | mol % | 0.0000 | 0.0000 | 0.0000 | 0.0000 | 0.0000 | 0.0035 | 0.0035 | 0.0035 |
| $SO_2$ | ppm | 682.0640 | 682.0640 | 674.1874 | 582.3298 | 211.6383 | 0.0000 | 0.0000 | 0.0000 |
| $H_2O$ | mol % | 4.2599 | 4.2599 | 4.2524 | 4.1656 | 3.8150 | 75.7983 | 75.7983 | 75.7983 |
| $H_2SO_4$ | mol % | 0.0000 | 0.0000 | 0.0080 | 0.1008 | 0.4753 | 15.5558 | 15.5558 | 15.5558 |

| | | Stream Number | | | | | | | |
|---|---|---|---|---|---|---|---|---|---|
| | | 11 | 12 | 13 | 15 | 17 | 18 | 19 | 20 |
| Temperature | ° C. | 30.05 | 93.67 | 20.00 | 25.64 | 25.64 | 30.00 | 30.00 | 29.88 |
| Pressure | bar a | 15 | 30 | 30 | 30 | 30 | 30 | 30 | 30 |
| Flow | kg/s | 143.02 | 143.02 | 143.02 | 1.54 | 110.29 | 110.29 | 1.50 | 142.99 |
| Composition | | | | | | | | | |
| AR | mol % | 2.9124 | 2.9124 | 2.9124 | 0.0013 | 0.0013 | 0.0013 | 0.0000 | 2.9105 |
| $CO_2$ | mol % | 75.7437 | 75.7437 | 75.7437 | 0.9792 | 0.9792 | 0.9792 | 0.0000 | 75.6733 |
| $N_2$ | mol % | 16.9186 | 16.9186 | 16.9186 | 0.0044 | 0.0044 | 0.0044 | 0.0000 | 16.9078 |
| NO | ppm | 71.2045 | 71.2045 | 71.2045 | 0.0342 | 0.0342 | 0.0342 | 0.0000 | 8.1626 |
| $NO_2$ | ppm | 0.0591 | 0.0591 | 0.0591 | 0.0011 | 0.0011 | 0.0011 | 0.0000 | 0.0070 |
| $O_2$ | mol % | 4.3328 | 4.3328 | 4.3328 | 0.0020 | 0.0020 | 0.0020 | 0.0000 | 4.3253 |
| $N_2O_4$ | mol % | 0.0000 | 0.0000 | 0.0000 | 0.0000 | 0.0000 | 0.0000 | 0.0000 | 0.0000 |
| $HNO_3$ | mol % | 0.0314 | 0.0314 | 0.0314 | 1.6380 | 1.6380 | 1.6380 | 0.0000 | 0.0000 |
| $HNO_2$ | mol % | 0.0000 | 0.0000 | 0.0000 | 0.0010 | 0.0010 | 0.0010 | 0.0000 | 0.0000 |
| $SO_2$ | ppm | 0.0000 | 0.0000 | 0.0000 | 0.0000 | 0.0000 | 0.0000 | 0.0000 | 0.0000 |
| $H_2O$ | mol % | 0.0540 | 0.0540 | 0.0540 | 97.3741 | 97.3741 | 97.3741 | 100.0000 | 0.1823 |
| $H_2SO_4$ | mol % | 0.0000 | 0.0000 | 0.0000 | 0.0000 | 0.0000 | 0.0000 | 0.0000 | 0.0000 |

TABLE 2

| | | Stream Number | | | | | | | |
|---|---|---|---|---|---|---|---|---|---|
| | | 1 | 2 | 3 | 4 | 5 | 7 | 9 | 10 |
| Temperature | ° C. | 30.00 | 307.30 | 185.00 | 50.00 | 35.53 | 69.10 | 69.10 | 30.00 |
| Pressure | bar a | 1.01 | 15 | 15 | 15 | 15 | 15 | 15 | 15 |
| Flow | kg/s | 150.60 | 150.60 | 150.60 | 150.60 | 150.60 | 7.99 | 130.36 | 130.36 |
| Composition | | | | | | | | | |
| AR | mol % | 2.7173 | 2.7173 | 2.7176 | 2.7213 | 2.7362 | 0.0000 | 0.0000 | 0.0000 |
| $CO_2$ | mol % | 70.6708 | 70.6708 | 70.6790 | 70.7751 | 71.1643 | 0.0446 | 0.0446 | 0.0446 |
| $N_2$ | mol % | 15.7852 | 15.7852 | 15.7870 | 15.8085 | 15.8954 | 0.0003 | 0.0003 | 0.0003 |
| NO | ppm | 4102.3231 | 4102.3231 | 4104.2307 | 4109.8117 | 4132.4137 | 0.2158 | 0.2158 | 0.2158 |
| $NO_2$ | ppm | 1.4353 | 1.4353 | 0.0000 | 0.0000 | 0.0000 | 0.0197 | 0.0197 | 0.0197 |
| $O_2$ | mol % | 4.6834 | 4.6834 | 4.6801 | 4.6412 | 4.4834 | 0.0000 | 0.0000 | 0.0000 |
| $N_2O_4$ | mol % | 0.0000 | 0.0000 | 0.0000 | 0.0000 | 0.0000 | 0.0000 | 0.0000 | 0.0000 |
| $HNO_3$ | mol % | 0.0000 | 0.0000 | 0.0000 | 0.0000 | 0.0000 | 7.5420 | 7.5420 | 7.5420 |
| $HNO_2$ | mol % | 0.0000 | 0.0000 | 0.0000 | 0.0000 | 0.0000 | 0.0042 | 0.0042 | 0.0042 |
| $SO_2$ | ppm | 1473.3661 | 1473.3661 | 1465.8141 | 1377.1532 | 1018.0919 | 0.0000 | 0.0000 | 0.0000 |
| $H_2O$ | mol % | 4.2596 | 4.2596 | 4.2523 | 4.1675 | 3.8237 | 58.8148 | 58.8148 | 58.8148 |
| $H_2SO_4$ | mol % | 0.0000 | 0.0000 | 0.0077 | 0.0984 | 0.4656 | 33.5940 | 33.5940 | 33.5940 |

TABLE 2-continued

| | | Stream Number | | | | | | | |
|---|---|---|---|---|---|---|---|---|---|
| | | 11 | 12 | 13 | 15 | 17 | 18 | 19 | 20 |
| Temperature | °C. | 30.09 | 93.66 | 20.00 | 25.89 | 25.89 | 30.00 | 30.00 | 29.95 |
| Pressure | bar a | 15 | 30 | 30 | 30 | 30 | 30 | 30 | 30 |
| Flow | kg/s | 142.61 | 142.61 | 142.61 | 1.61 | 110.29 | 110.29 | 1.50 | 142.51 |
| Composition | | | | | | | | | |
| AR | mol % | 2.9249 | 2.9249 | 2.9249 | 0.0009 | 0.0009 | 0.0009 | 0.0000 | 2.9230 |
| $CO_2$ | mol % | 76.0687 | 76.0687 | 76.0687 | 0.8085 | 0.8085 | 0.8085 | 0.0000 | 76.0027 |
| $N_2$ | mol % | 16.9913 | 16.9913 | 16.9913 | 0.0034 | 0.0034 | 0.0034 | 0.0000 | 16.9807 |
| NO | ppm | 85.9226 | 85.9226 | 85.9226 | 0.0354 | 0.0354 | 0.0354 | 0.0000 | 9.8390 |
| $NO_2$ | ppm | 0.0496 | 0.0496 | 0.0496 | 0.0013 | 0.0013 | 0.0013 | 0.0000 | 0.0089 |
| $O_2$ | mol % | 3.9236 | 3.9236 | 3.9236 | 0.0013 | 0.0013 | 0.0013 | 0.0000 | 3.9154 |
| $N_2O_4$ | mol % | 0.0000 | 0.0000 | 0.0000 | 0.0000 | 0.0000 | 0.0000 | 0.0000 | 0.0000 |
| $HNO_3$ | mol % | 0.0768 | 0.0768 | 0.0768 | 3.6600 | 3.6600 | 3.6600 | 0.0000 | 0.0000 |
| $HNO_2$ | mol % | 0.0000 | 0.0000 | 0.0000 | 0.0013 | 0.0013 | 0.0013 | 0.0000 | 0.0000 |
| $SO_2$ | ppm | 0.0000 | 0.0000 | 0.0000 | 0.0000 | 0.0000 | 0.0000 | 0.0000 | 0.0000 |
| $H_2O$ | mol % | 0.0059 | 0.0059 | 0.0059 | 95.5246 | 95.5246 | 95.5246 | 100.0000 | 0.1772 |
| $H_2SO_4$ | mol % | 0.0000 | 0.0000 | 0.0000 | 0.0000 | 0.0000 | 0.0000 | 0.0000 | 0.0000 |

Throughout the specification, the term "means" in the context of means for carrying out a function, is intended to refer to at least one device adapted and/or constructed to carry out that function.

It will be appreciated that the invention is not restricted to the details described above with reference to the preferred embodiments but that numerous modifications and variations can be made without departing from the spirit and scope of the invention as defined in the following claims.

The invention claimed is:

1. A method for the removal of at least a portion of one or more contaminants selected from the group consisting of $SO_2$ and $NO_x$ from gaseous carbon dioxide, said method comprising:
    maintaining said gaseous carbon dioxide at elevated pressure(s) in the presence of molecular oxygen and water and, when $SO_2$ is to be removed, $NO_x$, for a sufficient time to convert $SO_2$ to sulfuric acid and/or $NO_x$ to nitric acid; and
    separating said sulfuric acid and/or nitric acid from said gaseous carbon dioxide to produce $SO_2$-free, $NO_x$-lean carbon dioxide gas;
    wherein said elevated pressure(s) is(are) at least about 3 bar.

2. The method according to claim 1 wherein said elevated pressure(s) is between about 10 bar and about 50 bar.

3. The method according to claim 1 wherein said molecular oxygen is present in the gaseous carbon dioxide.

4. The method according to claim 1 comprising washing said gaseous carbon dioxide with water in at least one counter current gas/liquid contact device to produce said $SO_2$-free, $NO_x$-lean carbon dioxide gas and an aqueous sulfuric acid solution and/or an aqueous nitric acid solution.

5. The method according to claim 4 further comprising recycling at least a portion of the or each aqueous solution to the or each respective gas/liquid contact device.

6. The method according to claim 5 further comprising pumping said portion(s) of the or each aqueous solution to higher pressure(s) to produce pumped solution(s) and cooling said pumped solution(s) before recycling.

7. The method according to claim 1 wherein said gaseous carbon dioxide comprises $SO_2$ and $NO_x$, said method comprising converting $SO_2$ to sulfuric acid at a first elevated pressure and converting $NO_x$ to nitric acid at a second elevated pressure which is higher than the first elevated pressure.

8. The method according to claim 7 wherein a portion of said $NO_x$ is converted to nitric acid at said first elevated pressure.

9. The method according to claim 7 comprising:
    washing said gaseous carbon dioxide with water at said first elevated pressure in a first counter current gas/liquid contact device to produce SO2-free carbon dioxide gas and an aqueous sulfuric acid solution;
    compressing at least a portion of said SO2-free carbon dioxide gas to the second elevated pressure; and
    washing at least a portion of said $SO_2$-free carbon dioxide gas with water at said second elevated pressure in a second counter current gas/liquid contact device to produce $SO_2$-free, $NO_x$-lean carbon dioxide gas and an aqueous nitric acid solution.

10. The method according to claim 9 further comprising recycling at least a portion of said aqueous sulfuric acid solution to the first gas/liquid contact device, optionally after pumping and/or cooling.

11. The method according to claim 9 further comprising recycling at least a portion of said aqueous nitric acid solution to the second gas/liquid contact device, optionally after pumping and/or cooling.

12. The method according to claim 9 wherein heat of compression is removed by indirect heat exchange with a coolant.

13. The method according to claim 12 wherein the coolant is feed water for an oxyfuel boiler.

14. The method according to claim 9 wherein a stream of water is injected into the top of second contact device.

15. The method according to claim 7 wherein the first elevated pressure is from about 10 bar to about 20 bar.

16. The method according to claim 7 wherein the second elevated pressure is from about 25 bar to about 35 bar.

17. The method according to claim 7 wherein said gaseous carbon dioxide has a residence time in the first gas/liquid contact device of from about 2 seconds to about 20 seconds.

18. The method according to claim 7 wherein said $SO_2$-free carbon dioxide gas has a residence time in the second gas/liquid contact device of from about 2 seconds to about 20 seconds.

19. The method according to claim 7 wherein the concentration of $NO_x$ in said gaseous carbon dioxide is from about 300 ppm to about 10,000 ppm.

20. The method according to claim 1 wherein said gaseous carbon dioxide does not comprise $NO_x$ as a contaminant, said method further comprising adding to said gaseous carbon dioxide at least the minimum amount of $NO_x$ required to convert said $SO_2$ to sulfuric acid.

21. The method according to claim 20 wherein the amount of $NO_x$ added is from about 300 ppm to about 10,000 ppm.

22. The method according to claim 1 wherein the temperature at which said gaseous carbon dioxide is maintained at said elevated pressure(s) to convert $SO_2$ to sulfuric acid and/or $NO_x$ to nitric acid is no more than about 80° C.

23. The method according to claim 1 wherein said gaseous carbon dioxide is compressed adiabatically to the elevated pressure(s).

24. The method according to claim 1 wherein crude gaseous carbon dioxide is produced in an oxyfuel combustion process and washed with water to remove solid particles and water soluble components thereby producing said gaseous carbon dioxide.

25. The method according to claim 24 wherein the oxyfuel combustion process involves the combustion of at least one sulfur containing fuel selected from the group consisting of carbonaceous fuel or hydrocarbon fuel, in a gas consisting essentially of molecular oxygen and, optionally, recycled flue gas from the combustion process.

26. The method according to claim 1 wherein at least a portion of said $SO_2$-free, $NO_x$-lean carbon dioxide gas is dried, purified to remove "inert" components, and compressed to a pipeline pressure of from about 80 bar to about 250 bar.

27. The method according to claim 1 wherein $SO_2$ is converted to sulfuric acid and/or $NO_x$ to nitric acid at inter-stages of a carbon dioxide compression train.

28. The method according to claim 1 wherein water is present in said gaseous carbon dioxide.

29. The method of claim 1 wherein any additional molecular oxygen added to the gaseous carbon dioxide to be treated is pure oxygen.

30. A method for the removal of SO2 and NOx from gaseous carbon dioxide produced in an oxyfuel combustion process, said method comprising:
    washing crude carbon dioxide produced in said oxyfuel combustion process with water to remove solid particles and water soluble components thereby producing said gaseous carbon dioxide;
    compressing adiabatically at least a portion of said gaseous carbon dioxide to produce gaseous carbon dioxide at a first elevated pressure;
    washing said gaseous carbon dioxide with water at said first elevated pressure in a first counter current gas/liquid contact device to produce $SO_2$-free carbon dioxide gas and an aqueous sulfuric acid solution, at least a portion of said aqueous sulfuric acid solution being recycled to the first gas/liquid contact device;
    compressing at least a portion of said SO2-free carbon dioxide gas to produce SO2-free carbon dioxide gas at a second elevated pressure; and
    washing said $SO_2$-free carbon dioxide gas with water at said second elevated pressure in a second counter current gas/liquid contact device to produce $SO_2$-free, $NO_x$-lean carbon dioxide gas and an aqueous nitric acid solution, at least a portion of said aqueous nitric acid solution being recycled to the second gas/liquid contact device.

* * * * *